Figure 2:
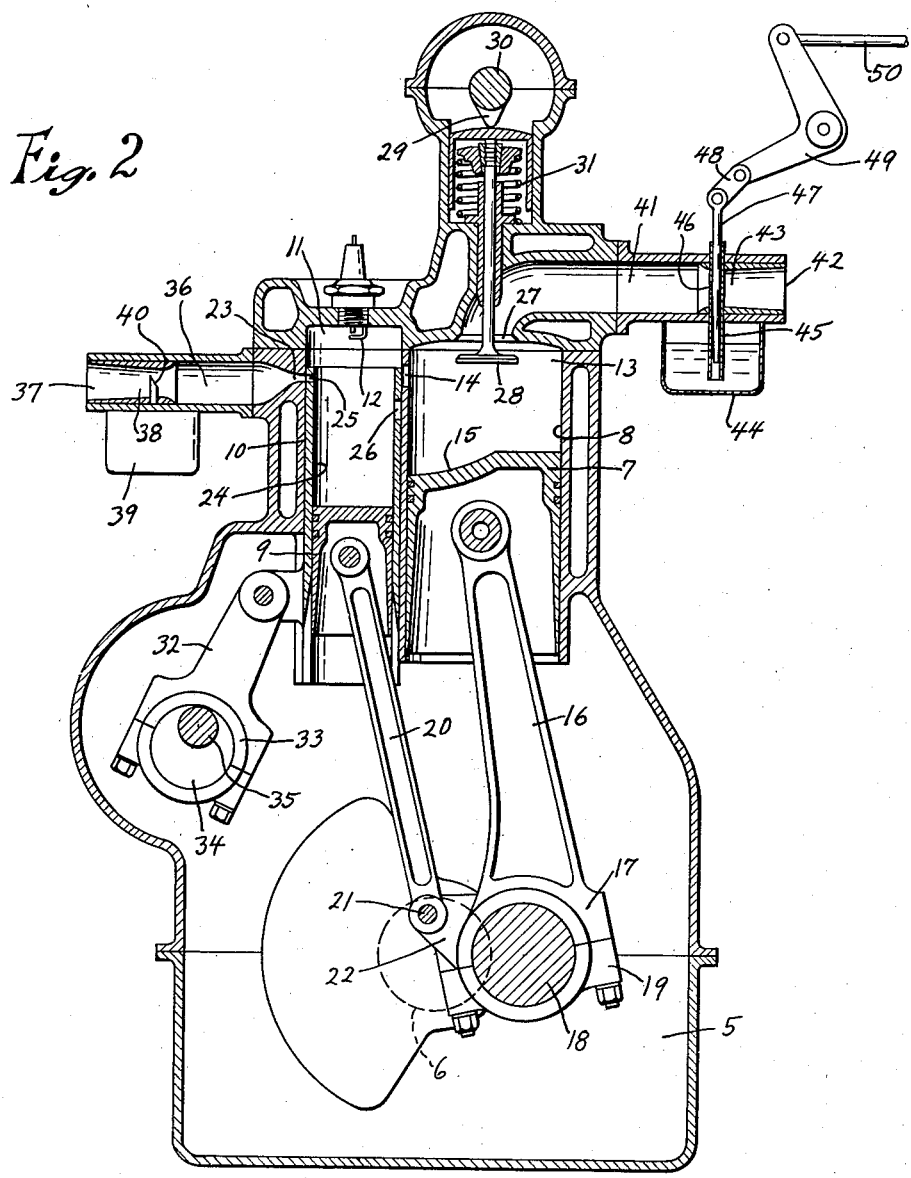

Aug. 31, 1937.                M. MALLORY                    2,091,411
                       INTERNAL COMBUSTION ENGINE
                        Filed June 15, 1936          2 Sheets-Sheet 1

Fig. 1

Inventor
Marion Mallory,
By E. N. Lovewell
Attorney

Patented Aug. 31, 1937

2,091,411

UNITED STATES PATENT OFFICE 2,091,411

INTERNAL COMBUSTION ENGINE

Marion Mallory, Detroit, Mich.

Application June 15, 1936, Serial No. 85,399

10 Claims. (Cl. 123—143)

This invention relates to a mechanically-timed and electrically-ignited four-cycle internal-combustion engine in which the cylinder pressures vary only with speed and not with throttle positions as in the case with other electrically-ignited four-cycle internal-combustion engines.

The object of this invention is to provide an engine in which two charges are admitted simultaneously and independently of each other, one charge being of larger volume than the other. The smaller charge is of a fixed volume, which varies only with engine speed, and is of proper proportions of air and fuel so that it will ignite with an electric spark. The larger charge is of a fixed volume of air, which varies only with engine speed, and which may be charged with gasoline, oil or the like to increase the power of the engine.

A further object is to provide means to positively segregate the two charges during the intake stroke or during the time when the cylinder pressure is below atmosphere to prevent commingling of the two charges.

A still further object is to provide an electrically-ignited four-cycle internal-combustion engine which receives a primary charge and a secondary charge, having fixed volumes that increase only with engine speed, said charges being admitted from two independent sources, whereby the vacuum will decrease in the cylinders as the engine speed is reduced (instead of increasing when the engine speed is reduced as in other electrically-ignited four-cycle engines) to prevent commingling of the two charges at idle and light loads or when the power is reduced.

In constructions as heretofore proposed involving the use of two independent charges, one of proper proportions of air and fuel and the other of air or a very lean mixture, the use of a throttle to vary the volume of either charge to control the power defeats any attempt to prevent commingling of the two charges because the throttle used to control volume increases the vacuum within the cylinders under light loads or when the engine is idling. The higher vacuum mixes the two charges together, resulting in leaning out the charge (that has proper proportions of air and fuel) to a point that it will not ignite by an electric spark. This condition is just opposite to what is desired, because the difficulty arising in the development of the constant compression engine has been ignition or explosion failure at idle, under light loads, or when the throttle was not in a wide open position.

My invention differs fundamentally from previous constructions. I provide a power unit, consisting of a large cylinder and a small cylinder which are not in communication with each other during the suction stroke or at a time when the pressure within the cylinders is below atmosphere, and, due to the fact that the charges admitted to the two cylinders are independent of each other and the volume is not controlled by valves to vary the power of the engine, the pressures within the cylinders will always be approximately equal. In other words, the pressures will be balanced against each other. Balanced pressures do not commingle as unbalanced pressures do. Moreover, the pressures of the two cylinders in my engine are not brought in communication with each other until the sub-pressures or vacuum created by the suction stroke has risen to atmosphere or above. This is accomplished by opening a communicative valve between the two cylinders at a time when the crankshaft has reached the end of the suction stroke and started upwardly on the compression stroke. For the reason that the two charging pressures are always balanced under all load conditions and are never brought in communication with each other until the cylinder pressures are at or above atmosphere, they will remain substantially stagnant in their respective cylinders.

My invention also differs fundamentally in ignition timing. For example, the small piston will reach top dead center approximately 10° in advance of the large piston, and, if the spark were timed to occur in the small cylinder 10° before the piston reached top dead center, the flame spread from the small cylinder (which requires a certain length of time to get under way) would ignite the charge in the large cylinder about the time its piston is 10° before dead center. This maintains proper ignition timing in both cylinders in relation to each other. Although I have stated that the pressures within the two cylinders are always substantially balanced, there will be a slight surge of some of the mixture from the small cylinder into the large one when the small piston nears the end of the compression stroke. This, however, is desirable because the spark will then occur when the mixture is in turbulence.

The construction and operation of the invention will be more specifically explained in connection with the accompanying drawings, in which,—

Fig. 1 is a vertical sectional view taken through one of the power units of the engine, having two cylinders and two combustion chambers, means for supplying a fixed volume of fuel mixture of proper proportions of air and fuel to the small combustion chamber, means for supplying a fixed volume of air to the large combustion chamber and means for admitting fuel to the large air charge regulated in proportion to the power demand of the engine. In this view, the pistons are approximately at the beginning of the intake stroke.

Fig. 2 is a similar view, with the intake stroke partially completed.

As shown in the drawings, the engine to which the invention pertains comprises a crank case 5, within which a crank shaft 6 is mounted. Each power unit comprises a comparatively large piston 7 reciprocable in the cylinder 8 and a small piston 9 reciprocable in the cylinder 10. At the upper end of the cylinder 10, there is a primary combustion chamber 11, in which there is a spark plug 12, and, at the upper end of the cylinder 8, there is a secondary combustion chamber 13, into which the flame is propagated from the chamber 11, through a port 14. This propagation is facilitated by curving the end of the piston 7 at one side as shown at 15. The engine may have any number of these power units corresponding to the number of cylinders in a conventional engine, but since these units are all alike, it has been deemed necessary to show only one.

The larger piston 7 has a connecting rod 16 formed with a bearing member 17 on the crank pin 18 of the shaft 6. This bearing member has a cap 19 secured by bolts or the like. The smaller piston 9 has a connecting rod 20 connected to a pin 21 mounted in an extension 22 of the bearing member 17.

The cylinder 10 has a fuel inlet 23. The ports 23 and 14 are shown in Fig. 1 as closed by a sleeve valve 24, which encircles the piston 9 within the cylinder 10. These ports are adapted to be alternately opened, however, as the sleeve valve is moved to bring the ports 25 and 26 in the valve successively into registry therewith. The cylinder 8 has an inlet port 27 controlled by a valve 28, which is adapted to be opened by a cam 29 on the cam shaft 30 against the resistance of a spring 31. It is deemed unnecessary to show the exhaust port or exhaust valve in the cylinder 8, since they may be of conventional construction and do not constitute parts of the invention.

The valve 24 is controlled through a connecting rod 32, which is connected at its upper end to a lug formed on the valve, and, at its other end, has a bearing 33 on an eccentric 34 formed on a shaft 35, the latter being driven at the same speed as the cam shaft 30, which is at half the speed of the crank shaft 6.

When the port 25 in the sleeve valve 24 registers with the port 23 during the intake stroke, fuel mixture is supplied to the primary combustion chamber 11 from a manifold 36. An air inlet 37 leads through a venturi 38 to the manifold 36, and a small carburetor 39 supplies fuel thereto through a jet opening 40 located in the venturi.

It will be noted that there is no valve in the carburetor 39 to control the volume of charge. It is initially adjusted to supply the proper amount of fuel mixture for idling and the volume of the charge cannot be changed by the operator because it has no valve.

An air charge is supplied to the secondary combustion chamber 13 through the port 27 from an intake manifold 41. An air inlet 42 leads through a venturi 43 to the manifold 41 and it has no valve, so that the volume of the charge cannot be changed by the operator, but varies only with the speed of the engine. A carburetor 44 is located beneath the venturi 43 and has an outlet tube 45 with an opening 46 into the venturi. The fuel supplied through the opening 46 into the air stream is metered by a tapered pin 47, which is slidable in the tube 45 and is connected by a link 48 and bell crank 49 to the throttle rod 50.

It will be noted that the smaller piston always leads the larger piston. In Fig. 1, these pistons are both approximately in upper dead center position and about to begin the intake stroke. In Fig. 2, the intake stroke is partially completed. In the meantime, the eccentric 34 on the shaft 35, which rotates at half the speed of the crank shaft 6, has actuated the sleeve valve 24 through the medium of the connecting rod 31 to uncover the intake port 23. At the same time, the cam 29 on the shaft 30, which also rotates at half the speed of the crank shaft 6, has opened the valve 28. At or soon after the beginning of the compression stroke, the ports 23 and 27 are closed and the port 26 in the valve 24 registers with the port 14 to establish communication between the two combustion chambers. Valve 28 remains open during the remainder of the compression stroke and also during the power and exhaust strokes.

As stated above, a substantially fixed charge suitable for idling is supplied through the port 23 and the charge of substantially constant volume supplied through the port 27 will be pure air if the metering pin 47 closes the opening 46. Fuel may be added to the latter charge in response to power demand by lifting the pin 47. During the intake stroke, the cylinders 10 and 8 are charged at substantially the same pressure. In the compression stroke, since the piston 9 leads the piston 7, there is practically no flow of air or fuel mixture from the cylinder 8 to the cylinder 10, although the port 14 is open. There may be a slight overflow from the cylinder 10 to the cylinder 8 as piston 9 nears the end of its compression stroke, which promotes the flame propagation to the cylinder 8 as soon as the spark occurs in the cylinder 10.

The mixture supplied to the cylinder 10 will be of the proper proportions to be easily ignited by the spark plug 12. The spark may be timed in the usual manner in accordance with operating conditions. The hot flame from the primary combustion chamber 11 will act as a pilot lighter for the secondary combustion chamber 13. Thus there is a two-stage ignition, and the slight time interval between the two stages approximates the lead of the piston 9 over the piston 7, so that a proper timing of the spark controls the ignition in both cylinders to obtain the ideal result.

It will be apparent that in this engine, the compression or charging pressures will not vary in the cylinders as a result of throttle variation, because the operation of the throttle neither increases nor diminishes the volume that flows into the cylinders. Unlike other engines, this engine is throttled entirely by injecting gasoline, oil or other fuel into the air stream entering the secondary combustion chamber. The primary combustion chamber plays the role of a pilot lighter and is not throttled. Its charge can be increased only by increasing the speed of the engine, which is accomplished by lifting the metering pin 47 to add more combustible fuel to the secondary combustion chamber 13, thereby increasing the power. The vacuum is low when idling, instead of high, as in other engines. There is just enough vacuum to draw a charge through the carburetor 39 for idling.

As a result of this construction, it will be impossible for the operator to vary the volume in either carburetor. Consequently, the compression and charging pressures in the cylinders will change only with engine speed and not by varying the power. It is the elimination of the varying of the volume of two charges admitted to the two cylinders and segregating the charges until the pressure within the cylinders is at or above atmosphere that prevents commingling of the two charges, resulting in an engine which will operate with constant compression at all speeds and loads without ignition or combustion failure.

While I have shown and described in detail the preferred embodiment of the invention, it will be understood that this is merely for the purpose of illustration and that the invention also embraces all such modifications as may be made within the scope of the appended claims.

Having thus described the invention, what I claim as new and desire to secure by Letters Patent, is:—

1. An internal combustion engine comprising two cylinders, one larger than the other, with a port connecting their upper ends, pistons reciprocable in the respective cylinders, fuel mixture supply means of fixed flow capacity to supply an idling charge to the smaller cylinder, independent means with an air inlet of fixed capacity to supply a charge to the larger cylinder, and means to maintain said connecting port closed substantially during the intake stroke or when the pressure within the cylinders is at or lower than atmosphere and to open it soon after the beginning of the compression stroke.

2. An internal combustion engine comprising two cylinders, one larger than the other, with a port connecting their upper ends, a fuel mixture passageway with unvarying fuel and air flow capacity suitable to supply an idling charge to the smaller cylinder, an independent mixture passageway leading to the larger cylinder and having an air flow of fixed capacity, means to supply a variable charge of fuel to the air stream through the last mentioned passageway, and means to close said connecting port substantially at the beginning of the intake stroke when the pressure within the cylinders is lower than atmosphere and to open it near the beginning of the compression stroke as the pressure exceeds atmosphere.

3. In an internal combustion engine, a comparatively small cylinder constituting a primary combustion chamber, a larger cylinder constituting a secondary combustion chamber, means including a valveless carburetor and a valveless passageway to supply a charge suitable for idling to the primary combustion chamber, means of fixed air capacity to selectively supply a charge of air or variable mixture to the secondary combustion chamber, mechanically controlled inlet valves for synchronously admitting the charges to the two cylinders, and means for igniting the primary charge and exploding it into the secondary charge.

4. In an internal combustion engine, two cylinders of different sizes, means of fixed air and fuel capacity to supply a charge suitable for idling to the smaller cylinder, independent means to supply a charge to the larger cylinder at substantially the same pressure as the charge to the smaller cylinder, pistons reciprocable in the respective cylinders, means for maintaining communication between the two cylinders substantially all of the time except during the intake stroke, and means to ignite the charge in the smaller cylinder and explode it into the larger cylinder.

5. An engine constructed in accordance with claim 1 and including means to cause the piston in the smaller cylinder to lead the other piston slightly during the compression stroke.

6. An engine constructed in accordance with claim 2 and including means to cause the piston in the smaller cylinder to lead the other piston slightly during the compression stroke.

7. An engine constructed in accordance with claim 3 and including means to cause the piston in the smaller cylinder to lead the other piston slightly during the compression stroke.

8. An engine constructed in accordance with claim 4 and including means to cause the piston in the smaller cylinder to lead the other piston slightly during the compression stroke.

9. An internal combustion engine comprising two cylinders, one larger than the other, with a port connecting their upper ends, means to supply a fixed idling charge to the smaller cylinder, other means to supply a charge to the larger cylinder, including a passageway having a fuel inlet, and a metering pin adjustable in said inlet and constituting the sole means for varying the power of the engine.

10. A mechanically-timed electrically-ignited four-cycle internal-combustion engine having one or more power units, each comprising a small cylinder adapted to receive a combustible charge of fixed volume for idling, a piston reciprocable in said small cylinder, a large cylinder adapted to receive a fixed non-combustible charge, a piston reciprocable in said large cylinder, mechanically operated valve means operable to admit said charges to the respective cylinders simultaneously, valve means for segregating the two charges during the time when the pressures within the two cylinders are sub-atmospheric, means for maintaining the last mentioned valve means open substantially during the remainder of the time, means for admitting fuel to the non-combustible charge to increase the power of the engine, and means for electrically igniting the charge in the small cylinder, whereby the flame therefrom will expand the charge in the large cylinder.

MARION MALLORY.